(12) United States Patent
Tang

(10) Patent No.: US 11,728,939 B2
(45) Date of Patent: Aug. 15, 2023

(54) TRANSPORT BLOCK COMMUNICATION AS PART OF MULTIPLE ACCESS WIRELESS COMMUNICATION

(71) Applicant: Google LLC, Mountain View, CA (US)

(72) Inventor: Chien-Hsin Tang, Taipei (TW)

(73) Assignee: Google LLC, Mountain View, CA (US)

( * ) Notice: Subject to any disclaimer, the term of this patent is extended or adjusted under 35 U.S.C. 154(b) by 283 days.

(21) Appl. No.: 16/973,007

(22) PCT Filed: Jun. 26, 2019

(86) PCT No.: PCT/US2019/039331
§ 371 (c)(1),
(2) Date: Dec. 7, 2020

(87) PCT Pub. No.: WO2020/006136
PCT Pub. Date: Jan. 2, 2020

(65) Prior Publication Data
US 2021/0250137 A1 Aug. 12, 2021

Related U.S. Application Data

(60) Provisional application No. 62/692,140, filed on Jun. 29, 2018.

(51) Int. Cl.
*H04L 1/20* (2006.01)
*H04L 5/00* (2006.01)
*H04L 1/1867* (2023.01)

(52) U.S. Cl.
CPC .......... *H04L 1/1893* (2013.01); *H04L 1/1896* (2013.01); *H04L 5/0005* (2013.01); *H04L 5/0053* (2013.01); *H04L 5/0078* (2013.01)

(58) Field of Classification Search
CPC ... H04L 5/0053; H04L 1/1829; H04L 1/1864; H04L 1/1869
See application file for complete search history.

(56) References Cited

U.S. PATENT DOCUMENTS 10,855,364 B2 * 12/2020 Alcorn ............... H04B 7/18506
11,489,584 B2 * 11/2022 Alcorn ................ H04B 7/1851
(Continued)

FOREIGN PATENT DOCUMENTS

| CN | 105934910 | 9/2016 |
| CN | 107258067 | 10/2017 |

(Continued)

OTHER PUBLICATIONS

"Foreign Office Action", JP Application No. 2020-560166, dated Feb. 22, 2022, 6 pages.
(Continued)

*Primary Examiner* — Diane L Lo
*Assistant Examiner* — Abusayeed M Haque
(74) *Attorney, Agent, or Firm* — Colby Nipper PLLC

(57) ABSTRACT

The present disclosure describes methods and systems applicable to transport block communication as part of multiple access wireless communications. The methods and systems include a base station (120) that determines a first order for a first plurality of non-orthogonal multiple access (NOMA) layers (705). The base station (120) receives, from a user equipment (110), the first plurality of NOMA layers that carry the transport block (710). The base station (120) combines the first plurality of NOMA layers following the determined first order (715) and determines that decoding the transport block from the first plurality of NOMA layers has failed (720). The base station (120) then determines a second order for a second plurality of NOMA layers (725) and receives, from the user equipment (110), the second plurality of NOMA layers that carry the transport block (730). The base station (120) then combines the second plurality of NOMA layers following the second order to decode the transport block from the second plurality of NOMA layers (735).

20 Claims, 8 Drawing Sheets

(56) References Cited

U.S. PATENT DOCUMENTS

| | | | |
|---|---|---|---|
| 2013/0028213 A1 | 1/2013 | Ko et al. | |
| 2014/0140283 A1 | 5/2014 | Jöngren | |
| 2016/0119096 A1* | 4/2016 | Sun | H04W 76/27 |
| | | | 370/329 |
| 2016/0191175 A1 | 6/2016 | Hiwang et al. | |
| 2017/0012754 A1* | 1/2017 | Sun | H04W 72/541 |
| 2017/0013599 A1* | 1/2017 | Sun | H04W 72/23 |
| 2017/0288817 A1 | 10/2017 | Cao et al. | |
| 2018/0123765 A1* | 5/2018 | Cao | H04L 5/0055 |
| 2019/0068311 A1* | 2/2019 | Park | H04L 1/0021 |
| 2020/0028611 A1* | 1/2020 | Lee | H04J 99/00 |
| 2020/0196335 A1* | 6/2020 | Lei | H04L 1/1614 |
| 2021/0120537 A1* | 4/2021 | Lei | H04L 1/1893 |

FOREIGN PATENT DOCUMENTS

| | | |
|---|---|---|
| CN | 107708209 | 2/2018 |
| CN | 107873127 | 4/2018 |
| CN | 107947841 | 4/2018 |
| EP | 3499972 | 6/2019 |
| JP | 2009506705 | 2/2009 |
| JP | 2016509784 | 3/2016 |
| JP | 2016189506 | 11/2016 |
| JP | 2018026661 | 2/2018 |
| WO | 2017167187 | 10/2017 |
| WO | 2017213397 | 12/2017 |
| WO | 2018030158 | 2/2018 |
| WO | 2018030764 | 2/2018 |
| WO | 2018074688 | 4/2018 |
| WO | 20180641582 | 4/2018 |
| WO | 2020006136 | 1/2020 |

OTHER PUBLICATIONS

"Transmitter Side Signal Processing Schemes for NOMA", 3GPP TSG RAN WG1 Meeting #93—R1-1807377, May 2018, 8 pages.

"International Preliminary Report on Patentability", Application No. PCT/US2019/039331, dated Dec. 29, 2020, 10 pages.

"International Search Report and Written Opinion", PCT Application No. PCT/US2019/039331, dated Oct. 14, 2019, 17 pages.

"Key Processing Modules at Transmitter Side for NOMA", 3GPP TSG RAN WG1 Meeting #93, Busan, Korea, May 21-25, 2018, May 2018, 11 pages.

"Foreign Office Action", JP Application No. 2020-560166, dated Oct. 4, 2022, 10 pages.

"Foreign Office Action", CN Application No. 201980028032.3, dated Nov. 24, 2022, 16 pages.

"Key Processing Modules at Transmitter Side for NOMA", 3GPP TSG RAN WG1 Meeting #93, Busan, Korea—R1-1805840, May 2018, 11 pages.

"Considerations On Procedures Related to Non-orthogonal Multiple Access", 3GPP TSG RAN WG1 Meeting 92-R1-1802635, Mar. 2018, 3 pages.

"Foreign Office Action", JP Application No. 2020-560166, dated Apr. 18, 2023, 5 pages.

* cited by examiner

TRANSPORT BLOCK COMMUNICATION AS PART OF MULTIPLE ACCESS WIRELESS COMMUNICATION

BACKGROUND

Multiple access (MA) wireless-communication techniques are an important aspect of a wireless-communication network. In general, multiple access wireless-communication techniques provide for two or more user equipment (UE) devices, such as smart phones, to share resources of a wireless-communication network in an efficient and effective manner. The resources may include, for example, physical resource blocks that span a time, a frequency, or a code domain that the UE devices share while communicating with a base station that supports the wireless-communication network.

Today, wireless network communication providers are implementing orthogonal multiple access (OMA) and non-orthogonal multiple access (NOMA) techniques to support multiple access communications as part of a Fifth Generation New Radio (5G NR) network. Using these techniques, UE devices may transmit data streams to the base station sharing MA resources, or OMA or NOMA resources, of an air interface. The base station may receive and distinguish data streams on different NOMA resources, or NOMA layers, via different multiple access signatures, which may be comprised of a spreading sequence, a non-orthogonal code, a power profile, or the like.

In general, the aforementioned techniques are unclear as to how to align communication configurations of the base station and the UEs and enable decoding of transport blocks. This lack of clarity applies to multiple access wireless communications implemented using both OMA and NOMA techniques and can, under certain circumstances, impact utilization of OMA and NOMA resources available to the base station and the UEs.

SUMMARY

The present disclosure describes methods and systems applicable to transport block communication as part of multiple access wireless communications. The methods and systems include a base station that determines a first order for a first plurality of NOMA layers. The base station receives, from a UE, the first plurality of NOMA layers which carry a transport block. The base station combines the first plurality of NOMA layers following the determined first order and determines that decoding the transport block from the first plurality of NOMA layers has failed. The base station then determines a second order for a second plurality of NOMA layers and receives, from the UE, the second plurality of NOMA layers which carry the transport block. The base station then combines the second plurality of NOMA layers following the second order to decode the transport block from the second plurality of NOMA layers.

In some aspects, a method performed by a base station is described. The method includes determining, by the base station and for a first plurality of NOMA layers, a first order and receiving, by the base station and from a UE, a transmission of the transport block, where the transmission uses the first plurality of NOMA layers. The method includes combining, by the base station, the first plurality of NOMA layers following the determined first order and determining, by the base station, that combining the first plurality of NOMA layers following the determined first order fails to decode the transport block from the first plurality of NOMA layers. The base station then determines, for a second plurality of NOMA layers, a second order. The method continues, where the base station receives, from the UE, a retransmission of the transport block, where the retransmission of the transport block uses the second plurality of NOMA layers. The base station then combines the second plurality of NOMA layers following the determined second order to decode the transport block from the second plurality of NOMA layers.

In other aspects, another method performed by a UE is described. The method includes the UE determining, for a first plurality of non-orthogonal multiple access layers, a first order. The UE then transmits, using the first plurality of non-orthogonal multiple access layers following the determined first order, a transport block to a base station. The method continues, where the UE receives, from the base station, a negative acknowledgment (NACK) message, the NACK message indicating that the base station failed to decode the transport block from the first plurality of non-orthogonal multiple access layers. In response to receiving the NACK message, the UE determines, for a second plurality of non-orthogonal multiple access layers, a second order. The UE then retransmits the transport block to the base station, using the second plurality of non-orthogonal multiple access layers following the determined second order.

In yet other aspects, a base station is described. The base station comprises a processor, a wireless transceiver, and a computer-readable storage media comprising instructions to implement a transport block manager. The transport block manager is configured to direct the base station to receive a transmission of a first transport block and another transmission of a second transport block, where the first transport block is carried by a first plurality of NOMA layers and the second transport block is carried by a second plurality of NOMA layers. The transport block manager also directs the base station to combine the first plurality of NOMA layers following a first order to decode the first transport block from the first plurality of NOMA layers and combine the second plurality of NOMA layers following a second order to decode the second transport block from the second plurality of NOMA layers.

The disclosed aspects align communication configurations of the base station and the UEs to enable decoding of transport blocks, improving utilization of OMA and NOMA resources available to the base station and the UEs. The described methods and systems accommodate combinations of underlying, interrelated techniques. Furthermore, although the methods and systems are described in terms of communicating a transport block using NOMA techniques, aspects of the descriptions are non-limiting and may apply to OMA techniques as well. The details of one or more implementations are set forth in the accompanying drawings and the following description. Other features and advantages will be apparent from the description and drawings, and from the claims.

BRIEF DESCRIPTION OF THE DRAWINGS

This document describes details of one or more aspects of transport block communication as part of multiple access wireless communications. The use of the same reference numbers in different instances in the description and the figures may indicate like elements.

DETAILED DESCRIPTION

While features and concepts of the described systems and methods for transport block communication as part of multiple access wireless communications can be implemented in any number of different environments, systems, devices, and/or various configurations, aspects of transport block communication as part of multiple access wireless communications are described in the context of the following example devices, systems, and configurations.

Operating Environment

Figure 1:
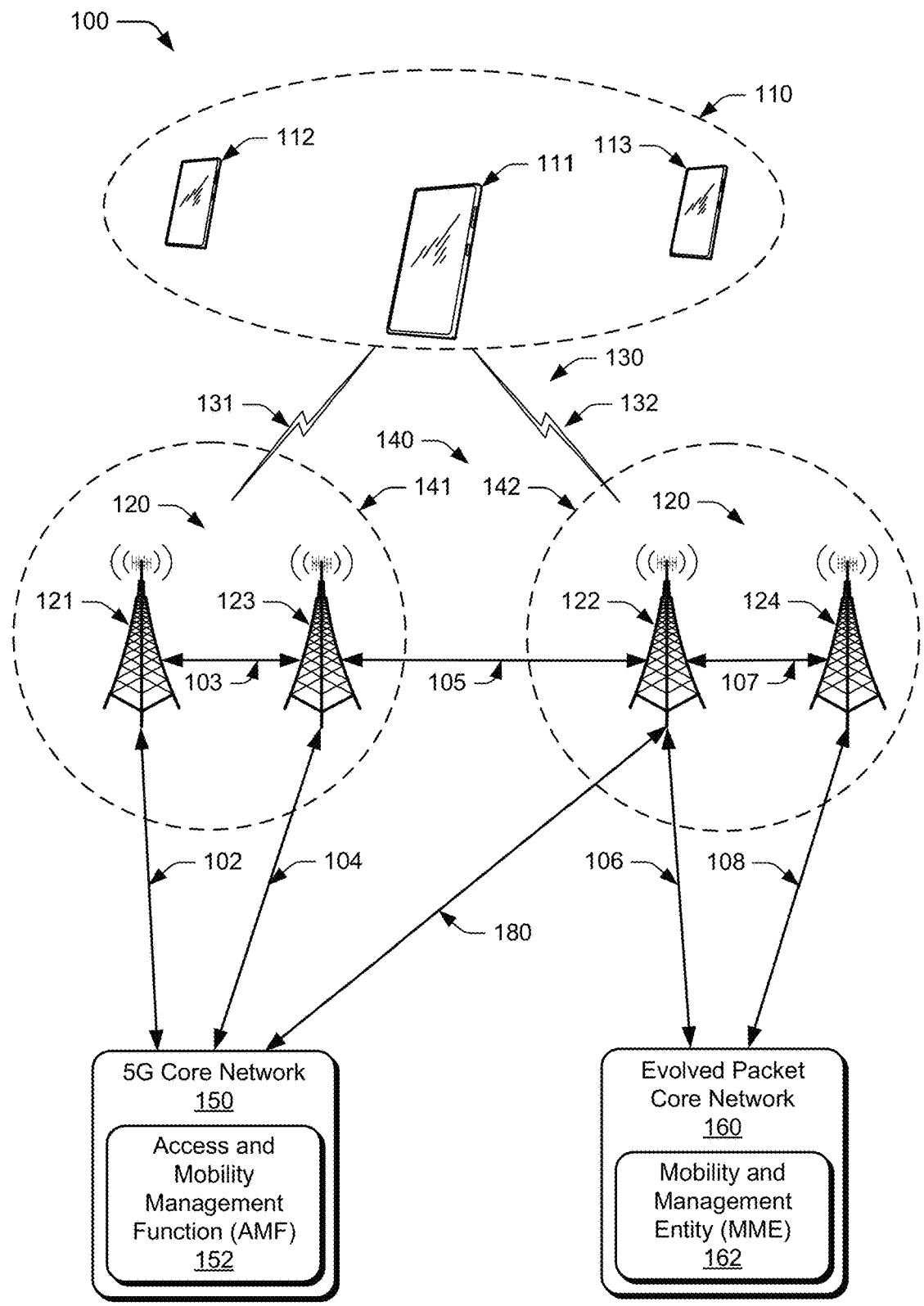
FIG. 1 illustrates an example operating environment in which various aspects of transport block communication as part of multiple access wireless communications can be implemented.

FIG. 1 illustrates an example operating environment 100 in which various aspects of transport block communication as part of multiple access wireless communications are implemented. The example environment 100 includes multiple user equipment 110 (UE 110), illustrated as UE 111, UE 112, and UE 113. Each UE 110 can communicate with base stations 120 (illustrated as base stations 121, 122, 123, and 124) through wireless communication links 130 (wireless link 130), illustrated as wireless links 131 and 132. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, or the like, or any combination thereof.

The base stations 120 communicate with the UE 110 using the wireless links 131 and 132, which may be implemented as any suitable type of wireless link. The wireless links 131 and 132 include control and data communication, such as downlink of data and control information communicated from the base stations 120 to the UE 110, uplink of other data and control information communicated from the UE 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN or NR RAN). The RANs 140 are illustrated as an NR RAN 141 and an E-UTRAN 142. The base stations 121 and 123 in the NR RAN 141 are connected to a Fifth Generation Core 150 (5GC 150) network. The base stations 122 and 124 in the E-UTRAN 142 are connected to an Evolved Packet Core 160 (EPC 160). Optionally or additionally, the base station 122 may connect to both the 5GC 150 and EPC 160 networks.

The base stations 121 and 123 connect, at 102 and 104 respectively, to the 5GC 150 through an NG2 interface for control-plane signaling and using an NG3 interface for user-plane data communications. The base stations 122 and 124 connect, at 106 and 108 respectively, to the EPC 160 using an S1 interface for control-plane signaling and user-plane data communications. Optionally or additionally, if the base station 122 connects to the 5GC 150 and EPC 160 networks, the base station 122 connects to the 5GC 150 using an NG2 interface for control-plane signaling and through an NG3 interface for user-plane data communications, at 180.

In addition to connections to core networks, the base stations 120 may communicate with each other. For example, the base stations 121 and 123 communicate through an Xn interface at 103, the base stations 122 and 123 communicate through an Xn interface at 105, and the base stations 122 and 124 communicate through an X2 interface at 107.

The 5GC 150 includes an Access and Mobility Management Function 152 (AMF 152), which provides control-plane functions, such as registration and authentication of multiple UE 110, authorization, and mobility management in the 5G NR network. The EPC 160 includes a Mobility Management Entity 162 (MME 162), which provides control-plane functions, such as registration and authentication of multiple UE 110, authorization, or mobility management in the E-UTRA network. The AMF 152 and the MME 162 communicate with the base stations 120 in the RANs 140 and also communicate with multiple UE 110.

Figure 2:
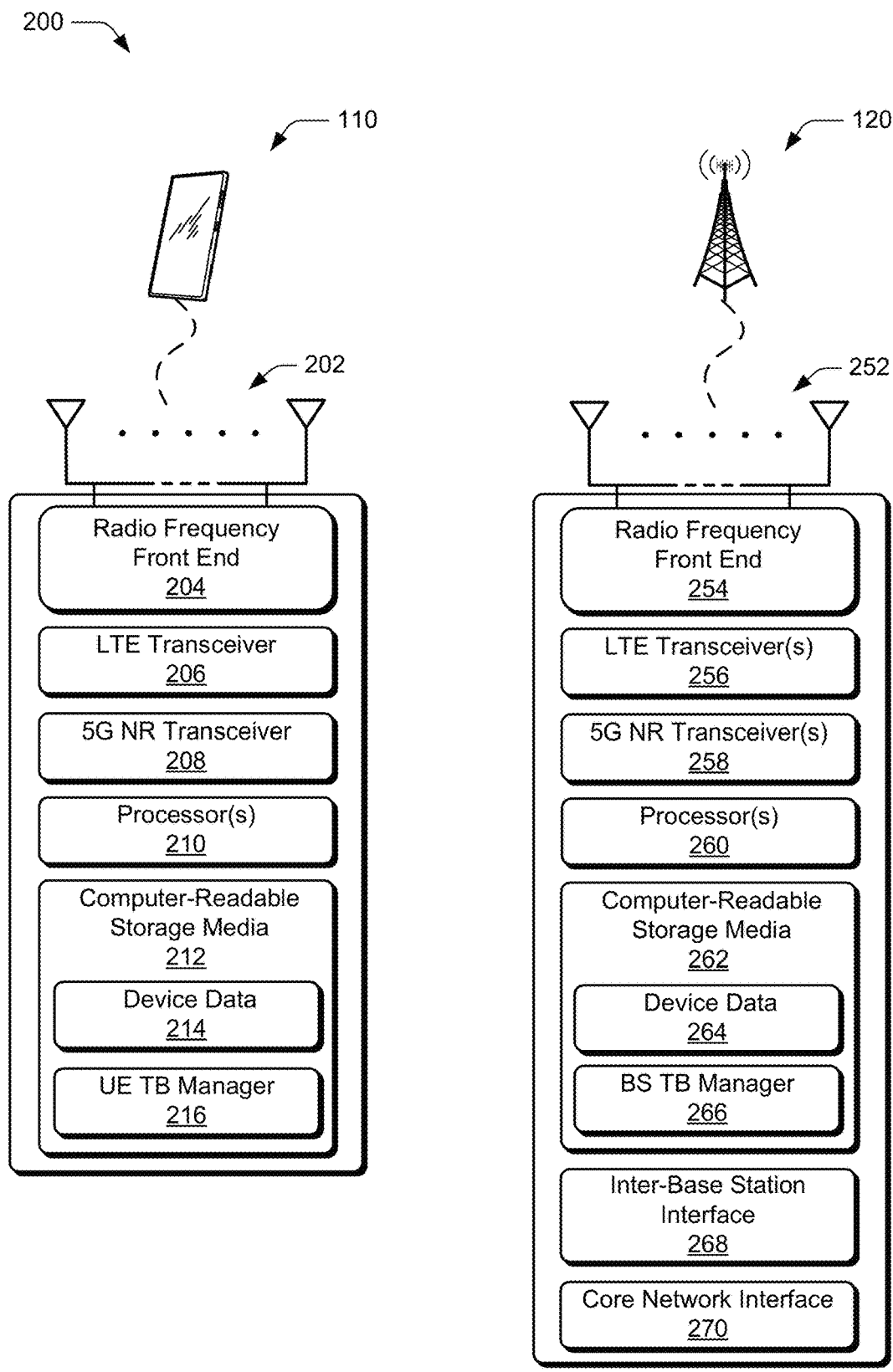
FIG. 2 illustrates example details of a user equipment and a base station supporting various aspects of transport block communication as part of multiple access wireless communications.

Within the operating environment 100, where transport block communication between the UE 110 and the base stations 120 may occur, the UE 110 may transmit non-orthogonal multiple access layers (e.g., NOMA layers) to the base station transport block manager 266 using the wireless links 130. The UE 110 and the base station 120 may, as detailed below, perform complementary methods directed to transport block communication as part of multiple access wireless communications. Such complementary methods can align communication configurations of the base stations 120 and the UE 110 and enable decoding of transport blocks Example Systems FIG. 2 illustrates example details 200 of a user equipment and a base station supporting various aspects of transport block communication as part of multiple access wireless communications. The UE 110 and the base stations 120 may include additional functions and interfaces that are omitted from FIG. 2 for the sake of clarity. The UE 110 includes antennas 202, a radio frequency front end 204 (RF front end 204), an LTE transceiver 206, and a 5G NR transceiver 208 for communicating with base stations 120 in the 5G RAN 141 and/or the E-UTRAN 142. The RF front end 204 of the UE 110 can couple or connect the LTE transceiver 206, and the 5G NR transceiver 208 to the antennas 202 to facilitate various types of wireless communication. The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHZ bands, and/or above 6 GHz bands that are defined by the 3GPP LTE and 5G NR communication standards.

The UE 110 also includes processor(s) 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the UE 110. The device data 214 includes user data, multimedia data, beamforming codebooks, applications, and/or an operating system of the UE 110, which are executable by processor(s) 210 to enable user-plane communication, control-plane signaling, and user interaction with the UE 110.

CRM 212 also includes a user equipment transport block manager 216 (e.g., the UE TB Manager 216) having executable instructions. Alternately or additionally, the UE transport block manager 216 may be implemented in whole or part as hardware logic or circuitry integrated with or separate from other components of the UE 110. In at least some aspects, the UE transport block manager 216 (e.g., the executable instructions of the UE transport block manager 216) configures the RF front end 204, the LTE transceiver 206, and/or the 5G NR transceiver 208 to implement the techniques performed by the UE 110 as related to transport block communication as part of multiple access wireless communications.

The device diagram for the base stations 120 shown in FIG. 2, includes a single network node (e.g., a gNode B). The functionality of the base station 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base station 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency bands defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with the UE 110.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base station transport block manager 266. The device data 264 includes network scheduling data, radio resource management data, beamforming codebooks, applications, and/or an operating system of the base stations 120, which are executable by processor(s) 260 to enable communication with the UE 110.

CRM 262 also includes a base station transport block manager 266 (e.g., BS TB manager 266) having executable instructions. Alternately or additionally, the base station transport block manager 266 may be implemented in whole or part as hardware logic or circuitry integrated with or separate from other components of the base stations 120.

In at least some aspects, the instructions of the base station transport block manager 266, when executed by the processor(s) 260, configures the RF front end 254, the LTE transceiver 256, and/or the 5G NR transceiver 258 to implement the techniques performed by the base stations 120 as related to transport block communication as part of multiple access wireless communications as described herein. Examples of such techniques, as performed by the base stations 120, include the base stations 120 determining an order of a plurality of NOMA layers, combining the plurality of NOMA layers following the determined order, and determining that decoding a transport block from the plurality of NOMA layers, following the determined order, has either succeeded or failed.

The base stations 120 can apply such techniques across multiple transport blocks and multiple pluralities of NOMA layers, such as a first transport block carried by a first plurality of NOMA layers and a second transport block carried by a second plurality of NOMA layers. In such instances, the base stations 120 may communicate with the UE 110 transmitting the multiple transport blocks to indicate different states of decoding, such as a successful decoding (e.g., transmit an ACK message to the UE 110 if decoding the first transport block following a first order is successful) in combination with a failed decoding (e.g., transmit a NACK message to the UE 110 if decoding the second transport block following a second order fails).

The base stations 120 include an inter-base station interface 268, such as an Xn and/or X2 interface, which is configurable to exchange user-plane and control-plane data between another base station 120, to manage the communication of the base stations 120 with the UE 110. The base stations 120 include a core network interface 270 that the base stations 120 configures to exchange user-plane and control-plane data with core network functions and entities.

Figure 3:
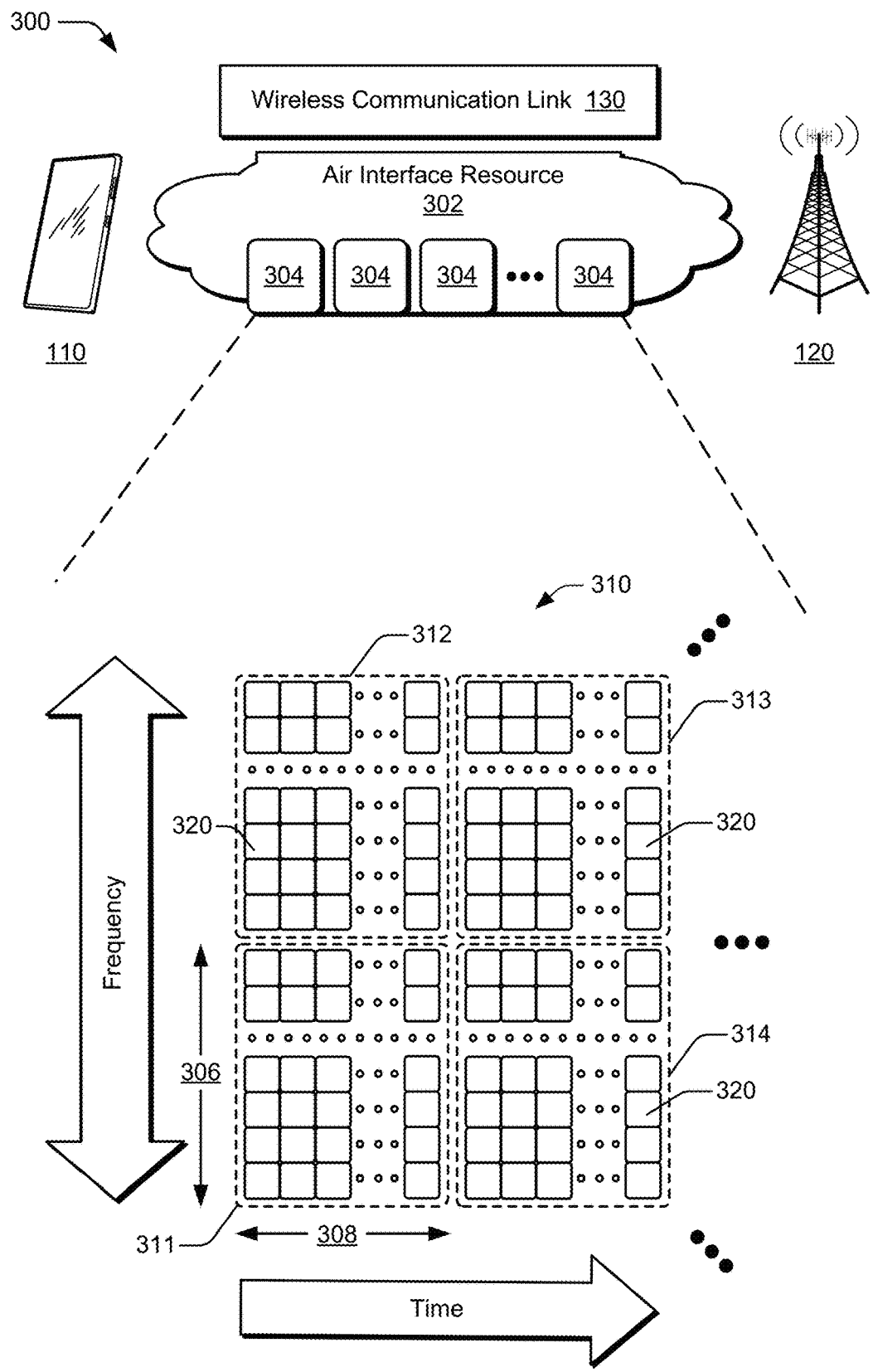
FIG. 3 illustrates example details of an air interface resource that extends between a UE and a base station and with which various aspects of transport block communication as part of multiple access wireless communications can be implemented.

FIG. 3 illustrates example details 300 of an air interface resource 302 that extends between a UE and a base station and with which various aspects of transport block communication as part of multiple access wireless communications can be implemented. In general, the air interface resource 302 provides the resources used by the NOMA layers described herein.

The air interface resource 302 can be divided into resource units 304, each of which occupies some intersection of frequency spectrum and elapsed time. A portion of the air interface resource 302 is illustrated graphically in a grid or matrix having multiple resource blocks 310, including example resource blocks 311, 312, 313, 314. An example of a resource unit 304 therefore includes at least one resource block 310. As shown, time is depicted along the horizontal dimension as the abscissa axis, and frequency is depicted along the vertical dimension as the ordinate axis. The air interface resource 302, as defined by a given communication protocol or standard, may span any suitable specified frequency range, and/or may be divided into intervals of any specified duration. Increments of time can correspond to, for example, milliseconds (mSec). Increments of frequency can correspond to, for example, megahertz (MHz).

In example operations generally, the base station 120 allocates portions (e.g., resource units 304) of the air interface resource 302 for uplink and downlink communications. Each resource block 310 of network access resources may be allocated to support respective wireless communication links 130 of multiple UE 110. In the lower left corner of the grid, the resource block 311 may span, as defined by a given communication protocol, a specified frequency range 306 and comprise multiple subcarriers or frequency sub-bands. The resource block 311 may include any suitable number of subcarriers (e.g., 12) that each correspond to a respective portion (e.g., 15 kHz) of the specified frequency range 306 (e.g., 180 kHz). The resource block 311 may also span, as defined by the given communication protocol, a specified time interval 308 or time slot (e.g., lasting approximately one-half millisecond or 7 orthogonal frequency-division multiplexing (OFDM) symbols). The time interval 308 includes subintervals that may each correspond to a symbol, such as an OFDM symbol.

As shown in FIG. 3, each resource block 310 may include multiple resource elements 320 (REs) that correspond to, or are defined by, a subcarrier of the frequency range 306 and a subinterval (or symbol) of the time interval 308. Alternatively, a given resource element 320 may span more than one frequency subcarrier or symbol. Thus, a resource unit 304 may include at least one resource block 310, at least one resource element 320, and so forth. In example implementations, the UE 110 is communicating with the base station 120 through access provided by portions of the air interface resource 302.

The base station 120 (e.g., the processor(s) 260 executing the instructions of the base station transport block manager 266) may allocate one or more resource elements 320 or individual subcarriers to the UE 110. As part of allocating the one or more resource elements 320 or individual subcarriers to the UE 110, the base station 120 may perform operations that identify the allocated one or more resource elements or the allocated individual subcarriers as multiple NOMA layers.

Figure 4:
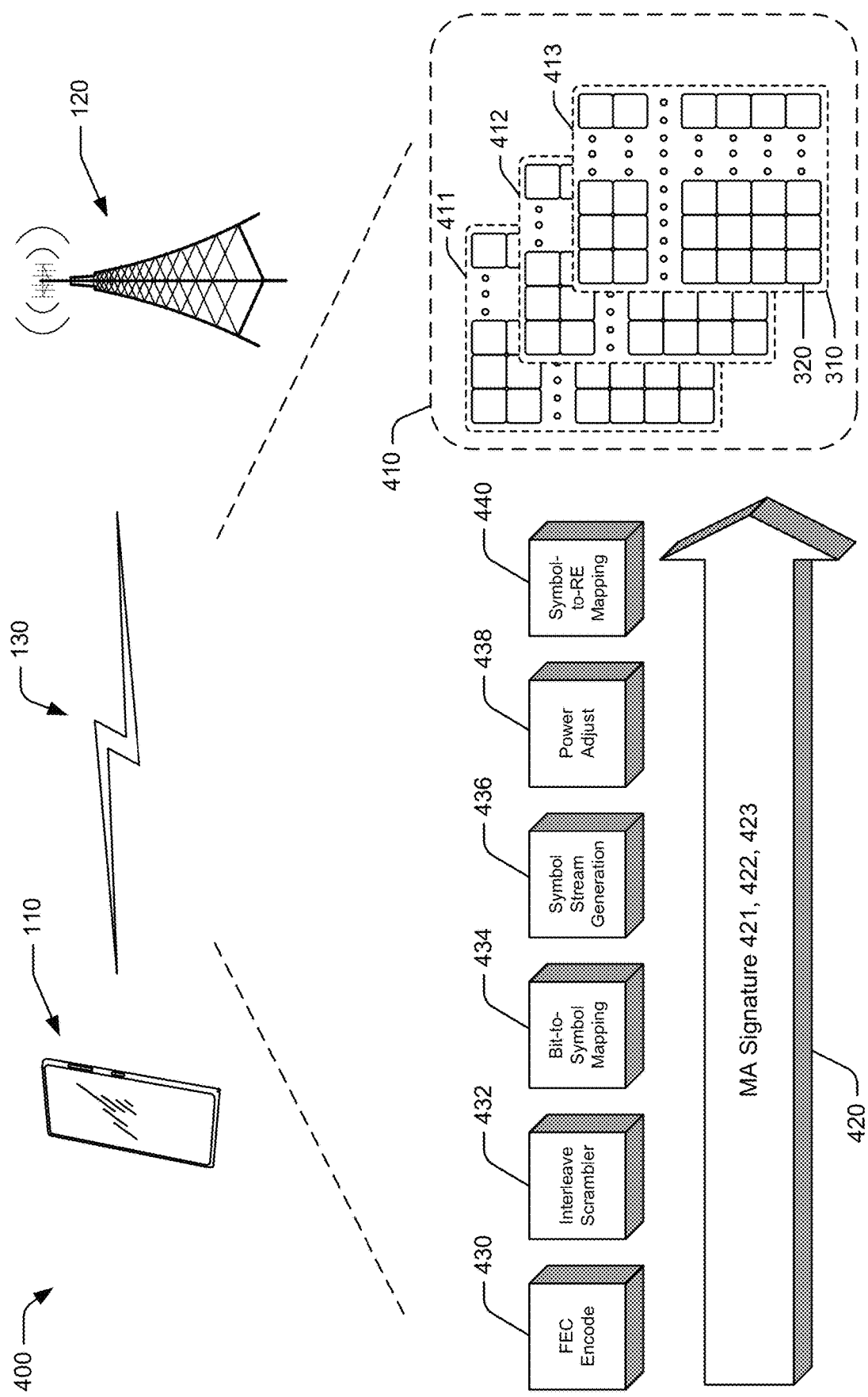
FIG. 4 illustrates example detail aspects of transport block communication as part of multiple access wireless communications.

FIG. 4 illustrates example detail aspects 400 of transport block communication as part of multiple access wireless communications. As illustrated, the UE 110 is transmitting a multi-branch data stream 410 to the base station 120 using the wireless link 130. In this example instance, the multi-branch data stream 410 includes multiple NOMA layers (e.g., NOMA layers 411, 412, and 413) from the resource block 310 of the air interface resource 302 of FIG. 3. Each NOMA layer 411 through 413 carries a respective portion of data of a transport block.

Although the NOMA layers 411 through 413 share corresponding physical resources that span common frequency and time domains (e.g., resource block 310 and resource elements(s) 320), the NOMA layers 411 through 413 (and corresponding data within the layers) are distinguishable through multiple access (MA) signatures(s) 420. The UE 110 (e.g., the processor 210 executing the instructions of the UE resource manager 216) may perform multiple operations while transmitting the multi-branch data stream 410 to associate an MA signature 420 (e.g., MA signature 421 through 423) to a respective NOMA layer (e.g., NOMA layer 411 through 413). Such operations include, for example, forward error correction and encoding 420, bit-level interleaving and scrambling 432, bit-to-symbol mapping 434, symbol stream generation 436, power adjustment 438, and symbol-to-resource element mapping 440. Examples of the resultant MA signature 421 through 423 associated with each respective NOMA layer 411 through 413 include an orthogonal code, a spreading code, or a transmission power.

Example Methods

Example methods 500 and 600 are described with reference to FIGS. 5 and 6 in accordance with one or more aspects of transport block communication. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 5:
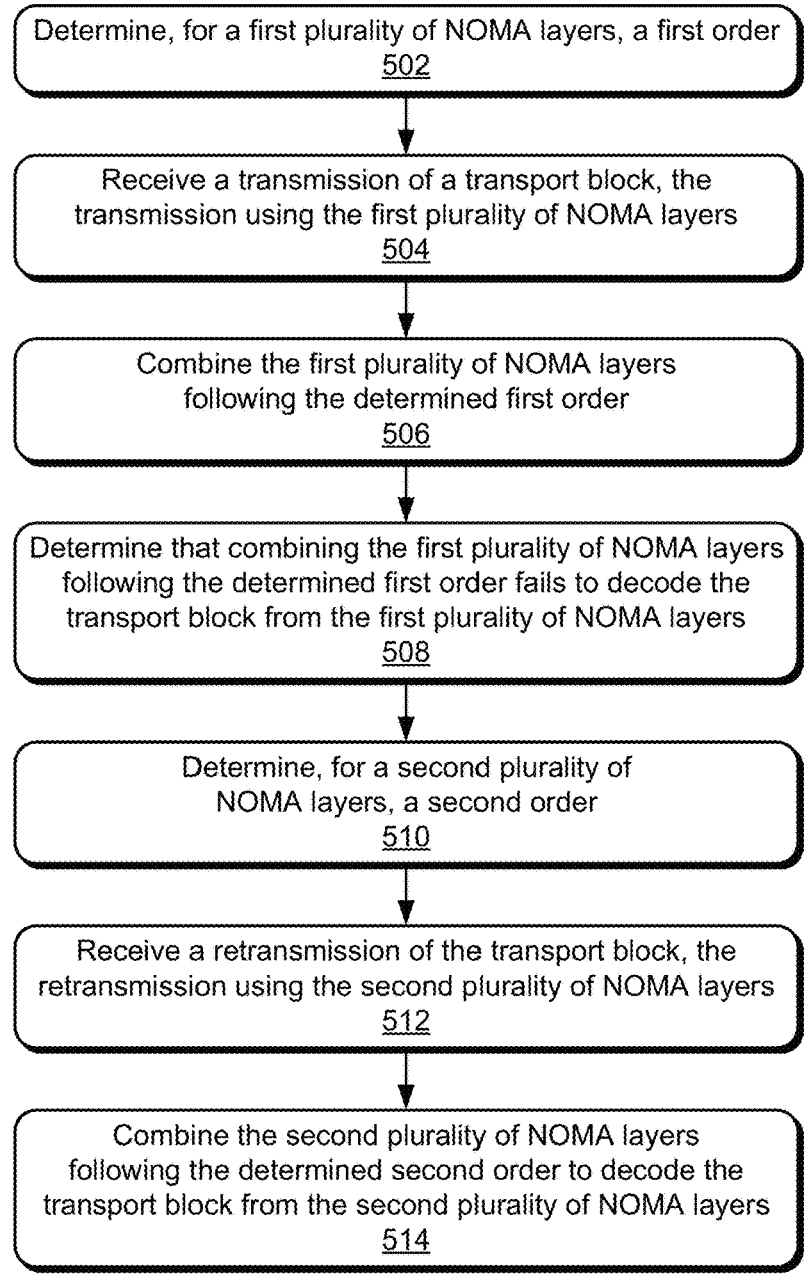
FIG. 5 illustrates an example method performed by a base station in accordance with various aspects of transport block communication as part of multiple access wireless communications.

FIG. 5 illustrates an example method 500 performed by a base station in accordance with various aspects of transport block communication as part of multiple access wireless communications. The method 500 is described in the form of a set of blocks 502-514 that specify operations that can be performed. However, operations are not necessarily limited to the order shown in FIG. 5 or described herein, for the operations may be implemented in alternative orders, in fully or partially overlapping manners, or in iterative fashions. Operations represented by the method 500 may be performed, for example, by the base station 120 of FIG. 1 and performed using elements of FIGS. 2-4.

At block 502, the base station (e.g., the processor 260 of the base station 120 executing the code of the base station transport block manager 266) determines, for a first plurality of NOMA layers (e.g., the NOMA layers 411 through 413 of FIG. 4), a first order (e.g., a sequence). In some instances, the base station determines the first order of the first plurality of NOMA layers from a wireless-communication specification. In other instances, the base station determines the first order of the first plurality of NOMA layers by computing the first order based on locations of time and frequency resources (e.g., time and frequency resources of the air interface resource 302 of FIG. 3) included in the first plurality of NOMA layers. The computing can rely upon a mathematical function that includes one or more parameters about the locations of the time and frequency resources.

At block 504, the base station receives, from a user equipment (e.g., the UE 110), transmission of a transport block. The transmission uses the first plurality of NOMA layers to carry the transport block (e.g., bit-level data included in the transport block is distributed across different layers of the first plurality of NOMA layers).

At block 506, the base station (e.g., the processor 260 of the base station 120 executing the code of the base station transport block manager 266) combines the first plurality of NOMA layers following the determined first order. At block 508, the base station determines that combining the first plurality of NOMA layers following the determined first order fails to decode the transport block from the first plurality of NOMA layers (e.g., the base station is not able to intelligibly aggregate the bit-level data included in the first plurality of NOMA layers).

Continuing with the method and at block 510, the base station determines, for a second plurality of NOMA layers, a second order. Determining the second order for the second plurality of NOMA layers may include one or more techniques like those described above as part of block 502 (e.g., techniques directed to determining the second order from a wireless-communication specification and/or computing the second order based on time and frequency locations of resources included in the second plurality of NOMA layers). The second plurality of NOMA layers, in general, uses resources that are different than the first plurality of NOMA layers that have different time and frequency locations.

At block 512 the base station receives, from the UE, a retransmission of the transport block. The retransmission uses the second plurality of NOMA layers, retransmitted using a different time interval than the transmitted first plurality of NOMA layers, to carry the transport block. At block 514, the base station combines the second plurality of NOMA layers following the determined second order to decode the transport block from the second plurality of NOMA layers.

Under certain circumstances, the method 500 may be modified to include additional or alternative operations. As a first example of additional or alternative operations, the method 500 may include the base station transmitting the determined first order of the first plurality of NOMA layers (and/or the second order of the second plurality of NOMA layers) to the UE. For instance, the base station can perform the transmission using broadcast signaling. In doing so, the broadcast signaling may use a system information block (SIB) that includes data indicative of a respective, determined order. Alternatively, the base station can perform the transmission using dedicated signaling. In doing so, the dedicated signaling may transmit a radio resource control (RRC) message or a physical downlink control channel (PDCCH) message that includes data indicative of the respective, determined order.

As a second example of additional or alternative operations, the method 500 may include the base station transmitting a negative acknowledgment (NACK) message and/or an acknowledgment (ACK) message to the UE. For instance, the base station may transmit a NACK message to the UE after the operation performed at block 508, where the NACK message may request the UE to perform the retransmission of the transport block using the second plurality of NOMA layers. The base station may also transmit an ACK message to the UE after successfully decoding the transport block (e.g., after the operation performed at block 514 or in the event the operation at block 506 successfully decodes the transport block, in which instance the method 500 terminates).

Figure 6:
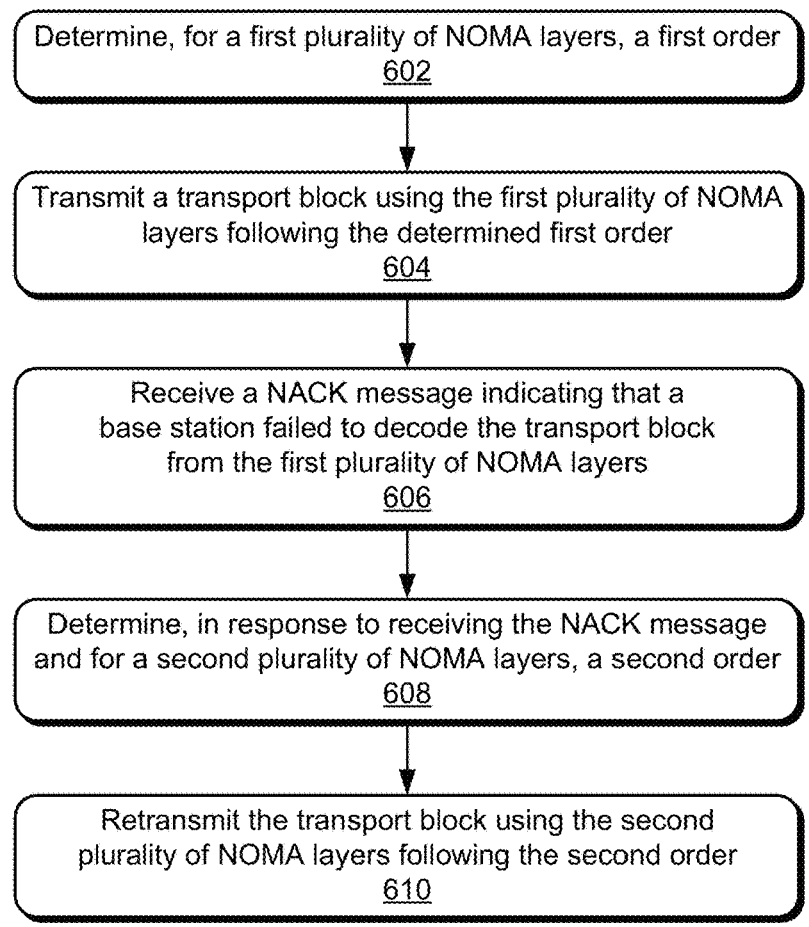
FIG. 6 illustrates an example method performed by a UE in accordance with various aspects of transport block communication as part of multiple access wireless communications.

FIG. 6 illustrates an example method 600 performed by a UE in accordance with various aspects of transport block communication as part of multiple access wireless communications. The method 600 is described in the form of a set of blocks 602-610 that specify operations that can be performed. However, operations are not necessarily limited to the order shown in FIG. 6 or described herein, for the operations may be implemented in alternative orders, in fully or partially overlapping manners, or in iterative fashions. Operations represented by the method 600 may be performed, for example, by the UE 110 of FIG. 1 and performed using elements of FIGS. 2-4.

At block 602, the UE (e.g., the processor 210 of the UE 110 executing the code of the UE TB manager 216) determines, for a first plurality of NOMA layers (e.g., the NOMA layers 411 through 413 of FIG. 4), a first order (e.g., a sequence). In some instances, the UE determines the first order of the first plurality of NOMA layers from a wireless-communication specification. In other instances, the UE determines the first order of the first plurality of NOMA layers by computing the first order based on locations of time and frequency resources (e.g., time and frequency resources of the air interface resource 302 of FIG. 3) that comprise the first plurality of NOMA layers. The computing can rely upon a mathematical function that includes one or more parameters about the locations of the time and frequency resources.

At block 604, the UE transmits, to a base station (e.g., the base station 120 of FIG. 1), a transport block using the first plurality of NOMA layers (e.g., the UE maps bit-level data included in the transport block across different layers of the first plurality of NOMA layers). Following the first determined order, the UE transmits the first plurality of NOMA layers that carry the transport block.

At block 606 the UE receives, from the base station, a negative acknowledgment (NACK) message. At block 608, and in response to receiving the NACK message, the UE determines a second order for a second plurality of NOMA layers. Determining the second order for the second plurality of NOMA layers may include one or more techniques like those described above as part of block 602 (e.g., techniques directed to determining the second order from a wireless-communication specification and/or computing the second order based on time and frequency locations of resources included in the second plurality of NOMA layers).

In some instances, the technique the UE uses to determine the second order at block 608 may be different than the technique the UE uses to determine the first order at block 602 (e.g., at block 602 the UE may determine the first order from the wireless-communication specification and at block 608 the UE may determine the second order by computing the second order based on locations of time and frequency resources associated with the second plurality of NOMA layers). The second plurality of NOMA layers, in general, uses resources that are different than the first plurality of NOMA layers that have different time and frequency locations.

At block 610 the UE retransmits the transport block using the second plurality of NOMA layers following the second determined order (e.g., the UE maps bit-level data included in the transport block across different layers of the second plurality of NOMA layers). The UE retransmits the second plurality of NOMA layers using a time interval that is different than another time interval associated with the UE transmitting the first plurality of NOMA layers.

Under certain circumstances, the method 600 may be modified to include additional or alternative operations. As a first example of additional or alternative operations, the method 600 may include the UE receiving the determined first order of the first plurality of NOMA layers (and/or the second order of the second plurality of NOMA layers) from the base station. For instance, the UE may receive the transmission through broadcast signaling. The broadcast signaling may use a system information block (SIB) that includes data indicative of a respective, determined order. Alternatively, the UE can receive the transmission through dedicated signaling. The dedicated signaling may use a radio resource control (RRC) message or a physical downlink control channel (PDCCH) message that includes data indicative of the respective, determined order.

As a second example of additional or alternative operations, the method 600 may include the UE receiving an acknowledgment (ACK) message from the base station. For instance, the UE may receive an ACK message from the base station if the base station successfully decodes the transport block following the operation performed at block 610 (or if the base station successfully decodes the transport block from the first plurality of NOMA layers at operation 604, in which instance the method 600 terminates).

Although the example techniques and systems above are described in the context of decoding a single transport block from a first and second plurality of NOMA layers, the techniques and systems are extendable to include additional permutations. An example of a permutation includes an instance in which the base station (e.g., the base station 120 under direction of the processor 260 executing the instructions of the base station transport block manager 266) decodes a first transmission block (carried by a first plurality of NOMA layers) and a second transmission block (carried by a second plurality of NOMA layers). For example, the base station may receive, from a UE (e.g., the UE 110), a transmission of a first transport block and another transmission of a second transport block, where the first transport block is carried by a first plurality of NOMA layers and the second transport block is carried by a second plurality of NOMA layers. The base station may combine the first plurality of NOMA layers following a first order to decode the first transport block from the first plurality of NOMA layers. The base station may also combine the second plurality of NOMA layers following a second order to decode the second transport block from the second plurality of non-orthogonal multiple access layers.

In some instances of the first example permutation, the base station may determine that combining the first plurality of NOMA layers following the first order to decode the first transport block from the first plurality of NOMA layers has failed and, in response, transmit to the UE a NACK message. Similarly, and as part of the first example permutation, the base station may determine that combining the second plurality of NOMA layers following the second order to decode the second transport block from the second plurality of NOMA layers has succeeded and, in response, transmit to the UE an ACK message.

Additional permutations which the described systems and techniques can accommodate, in general, include combinations of instances where a transport block is carried by a single NOMA layer or multiple NOMA layers (e.g., the number of NOMA layers is defined by i=1, 2, 3, 4 . . . N where i is a positive integer). Additionally, there may be a single transport block or multiple transport blocks (e.g., the number of transport blocks is defined by n=1, 2, 3, 4 . . . O where n is a positive integer). It is also possible for the base station 120 to support permutations from multiple UE 110.

Signaling and Control Transactions

Figure 7:
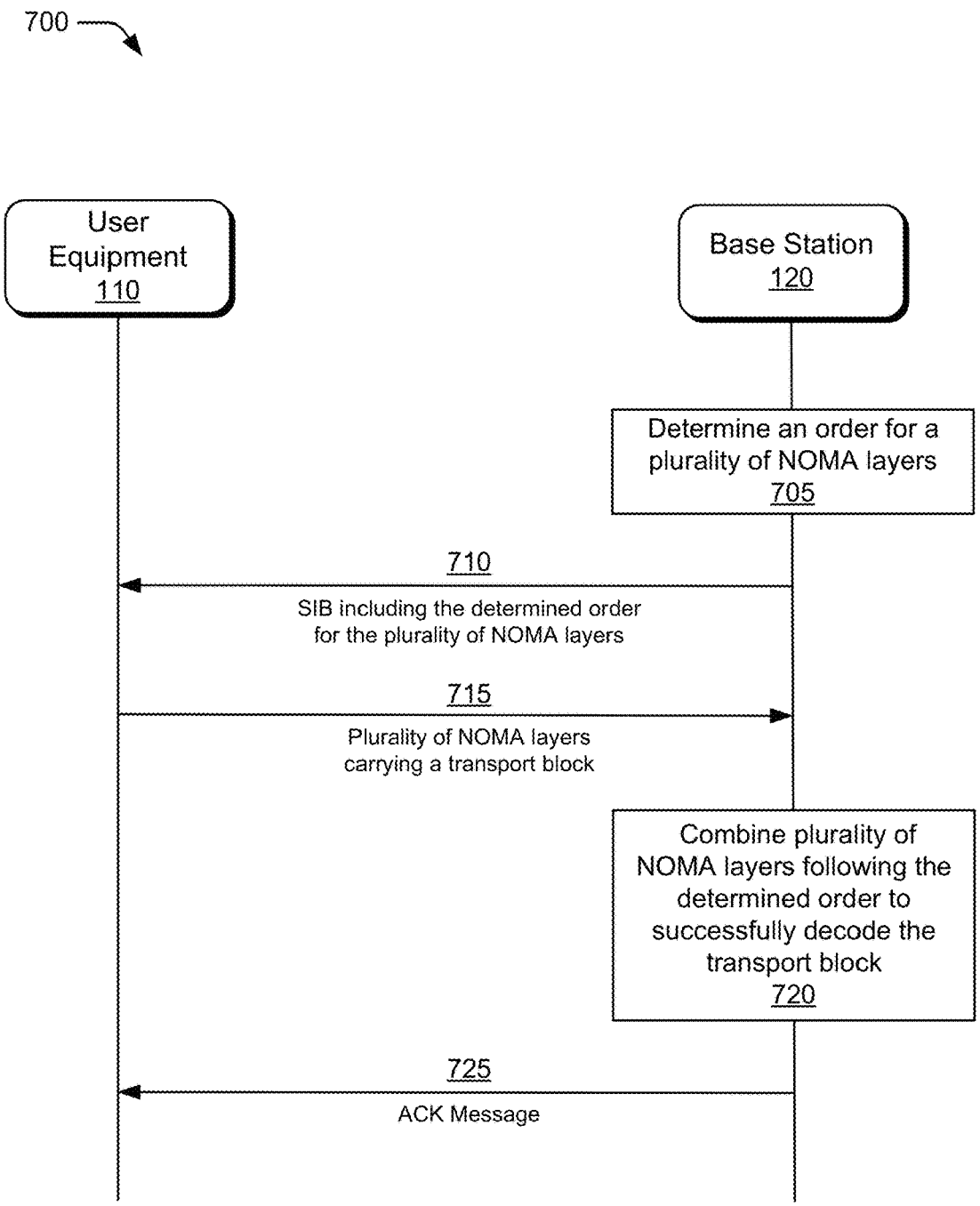
FIG. 7 illustrates a first example of a signaling and control transaction diagram between a base station and a UE in accordance with various aspects of transport block communication as part of multiple access wireless communications.
Figure 8:
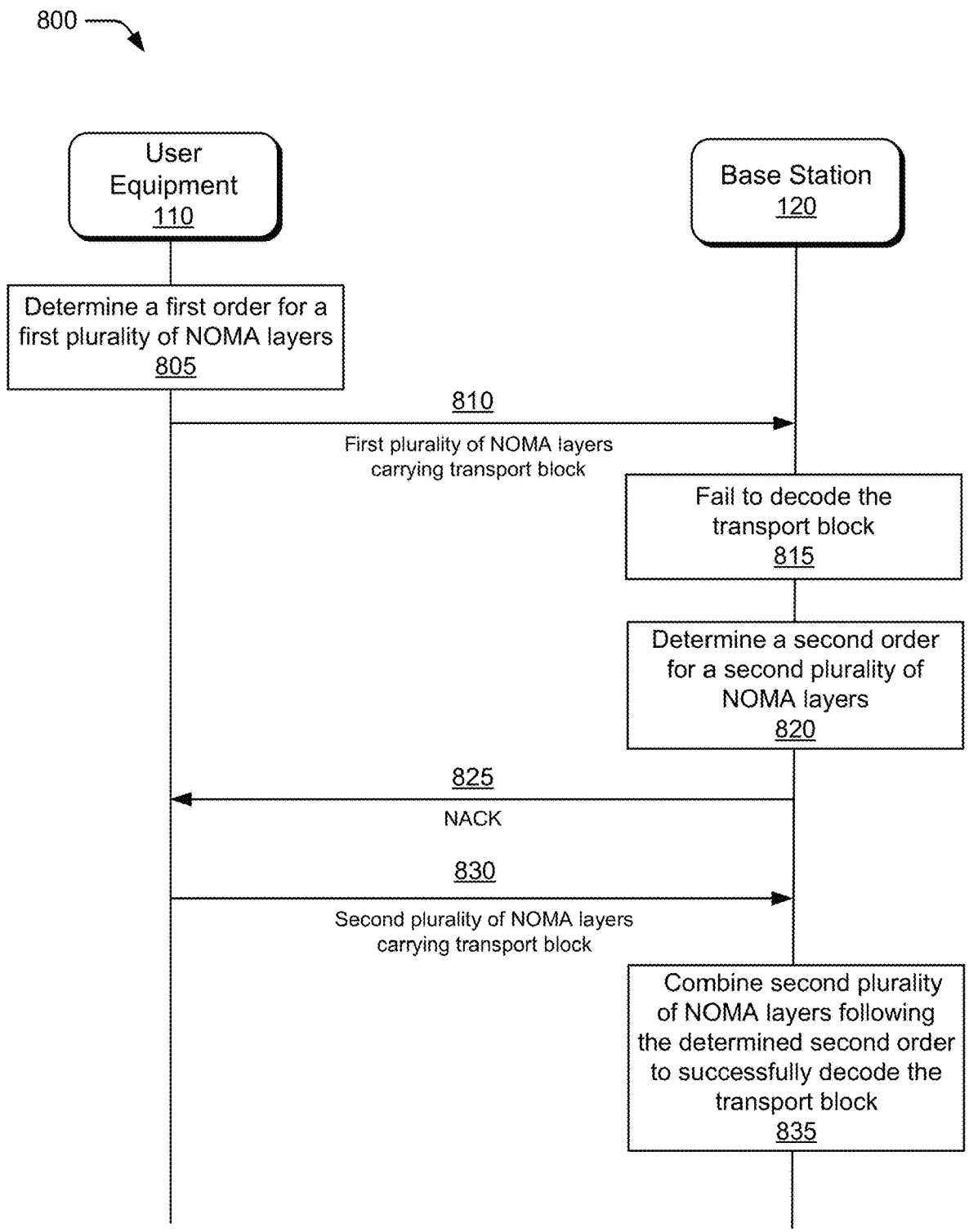
FIG. 8 illustrates a second example of a signaling and control transaction diagram between a base station and a UE in accordance with various aspects of transport block communication as part of multiple access wireless communications.

FIGS. 7 and 8 illustrate example signaling and control transaction diagrams between a base station and a UE in accordance with various aspects of transport block communication as part of multiple access wireless communications. The signaling and control transactions may be performed by the base station 120 and the UE 110 of FIG. 1, using elements of FIGS. 1-4.

A first example of signaling and control transactions is illustrated by the signaling and transaction control diagram 700 of FIG. 7. As illustrated, at 705 the base station 120 determines an order for a plurality of NOMA layers. For example, the base station 120 may determine the order for the plurality of NOMA layers from a wireless-communication specification. Alternatively, the base station 120 may determine the order for the first plurality of NOMA layers by computing the order based on locations of time and frequency resources included in the plurality of NOMA layers.

At 710 the base station transmits, to the UE 110, a system information block (SIB) that includes the determined order for the plurality of NOMA layers. At 715, the UE 110 transmits, to the base station 120, a transport block using the plurality of NOMA layers following the determined order. In transmitting the transport block using the plurality of NOMA layers following the determined order, the UE 110 distributes bit-level data across different layers of the first plurality of NOMA layers.

At 720, the base station 120 combines the plurality of NOMA layers following the determined order to successful decode the transport block from the plurality of NOMA layers. At 725, and in response to successfully decoding the transport block, the base station 120 transmits an acknowledgment message to the UE 110.

A second example of signaling and control transactions is illustrated by the signaling and transaction control diagram 800 of FIG. 8. As illustrated, at 805 the UE 110 determines a first order for a first plurality of NOMA layers. For example, the UE 110 may determine the first order for the first plurality of NOMA layers from a wireless-communication specification. Alternatively, the UE 110 may determine the first order by computing the first order based on locations of time and frequency resources included in the first plurality of NOMA layers. At 810, the UE 110 transmits, to the base station 120, a transport block using the first plurality of NOMA layers. The transmission includes the UE 110 transmitting the first plurality of NOMA layers following the determined first order, where the UE 110 distributes bit-level data across different layers of the first plurality of NOMA layers.

At 815, the base station 120 fails to decode the transport block from the first plurality of NOMA layers. The base station 120 may fail to decode the transport block for several reasons, examples of which include the base station 120 anticipating a transport block that is transmitted following an order that is different than the first order as determined by the UE 110 (e.g., the wireless-communication specification the UE 110 uses to determine the first order may be outdated, the locations of time and frequency resources the UE 110 uses for computations may be in contention with an allocation of the time and frequency resources by the base station 120 to another UE, and so on).

At 820, the base station determines a second order for a second plurality of NOMA layers (e.g., the determined second order may be based on a current wireless-communication specification, computations that are compatible with allocations of time and frequency resources by the base station 120, and so on). At 825, the base station 120 transmits, to the UE 110, a negative acknowledgment (NACK) message. The NACK message can include several aspects, including a request for the UE 110 to transmit (e.g., retransmit) the transport block following the determined second order using the second plurality of NOMA layers.

At 830, the UE 110 transmits, to the base station 120, the transport block using the second plurality of NOMA layers. The transmission includes the UE 110 transmitting the second plurality of NOMA layers following the determined second order, where the UE 110 distributes bit-level data across different layers of the second plurality of NOMA layers. At 835 the base station 120 combines the second plurality of NOMA layers following the determined second order to successfully decode the transport block.

In general, the example signaling and control transactions of FIGS. 7 and 8 may be iterated to accommodate additional signaling and control transactions associated with additional NOMA layers, transport blocks, and the like. The example signaling and control transactions may also include the transmission of acknowledgment (ACK) messages from the base station 120 to the UE 110 upon successful decoding of respective transmission blocks from respective pluralities of NOMA layers.

In the following, several examples are described.

Example 1: A method performed by a base station comprising: determining, by the base station and for a first plurality of non-orthogonal multiple access layers, a first order; receiving, by the base station and from a user equipment, a transmission of a transport block, the transmission using the first plurality of non-orthogonal multiple access layers; combining, by the base station, the first plurality of non-orthogonal multiple access layers following the determined first order; determining, by the base station, that combining the first plurality of non-orthogonal multiple access layers following the determined first order fails to decode the transport block from the first plurality of non-orthogonal multiple access layers; determining, by the base station and for a second plurality of non-orthogonal multiple access layers, a second order; receiving, by the base station and from the user equipment, a retransmission of the transport block, the retransmission using the second plurality of non-orthogonal multiple access layers; and combining, by the base station, the second plurality of non-orthogonal multiple access layers following the determined second order to decode the transport block from the second plurality of non-orthogonal multiple access layers.

Example 2: The method as recited in example 1, wherein determining the first order for the first plurality of non-orthogonal multiple access layers includes determining the first order from a wireless-communication specification.

Example 3: The method as recited in example 1, wherein determining the first order for the first plurality of non-orthogonal multiple access layers includes computing the first order based on locations of time and frequency resources comprising the first plurality of non-orthogonal multiple access layers.

Example 4: The method as recited in any one of examples 1 to 3, wherein determining the second order for the second plurality of non-orthogonal multiple access layers includes determining the second order from a wireless-communication specification.

Example 5: The method as recited in any one of examples 1 to 3, wherein determining the second order for the second plurality of non-orthogonal multiple access layers includes computing the second order based on locations of time and frequency resources comprising the second plurality of non-orthogonal multiple access layers.

Example 6: The method as recited in any one of examples 1 to 5, further comprising the base station using broadcast signaling to transmit, to the user equipment, the determined first order.

Example 7: The method as recited in example 6, wherein the broadcast signaling transmits the determined first order through a system information block that includes data indicative of the determined first order.

Example 8: The method as recited in any one of examples 1 to 5, further comprising the base station using dedicated signaling to transmit, to the user equipment, the determined first order.

Example 9: The method as recited in example 8, wherein the dedicated signaling transmits the determined first order through a radio resource control message that includes data indicative of the determined first order.

Example 10: The method as recited in any preceding example, further comprising the base station transmitting, in response to determining that combining the first plurality of non-orthogonal multiple access layers following the determined first order fails to decode the transport block from the first plurality of non-orthogonal multiple access layers, a negative acknowledgement message.

Example 11: A method performed by a user equipment comprising: determining, by the user equipment and for a first plurality of non-orthogonal multiple access layers, a first order; transmitting, by the user equipment and to a base station, a transport block, the transmitting using the first plurality of non-orthogonal multiple access layers following the determined first order; receiving, by the user equipment and from the base station, a negative acknowledgment message, the negative acknowledgment message indicating that the base station failed to decode the transport block from the first plurality of non-orthogonal multiple access layers; determining, by the user equipment in response to receiving the negative acknowledgment message and for a second plurality of non-orthogonal multiple access layers, a second order; and retransmitting, by the user equipment and to the base station, the transport block, the retransmitting using the second plurality of non-orthogonal multiple access layers following the determined second order.

Example 12: The method as recited in example 11, wherein determining the second order for the second plurality of multiple access layers includes determining the second order from data included in a system information block that the user equipment receives through broadcast signaling that is transmitted from the base station.

Example 13: The method as recited in example 11 or example 12, wherein determining the first order for the first non-orthogonal multiple access layers includes determining the first order from data included in a radio resource control message that the user equipment receives from the base station.

Example 14: A base station comprising: a processor; a wireless transceiver; and computer-readable storage media comprising instructions to implement a transport block manager, the transport block manager configured to direct the base station to: receive, from a user equipment and through the wireless transceiver, a transmission of a first transport block and another transmission of a second transport block, the first transport block carried by a first plurality of non-orthogonal multiple access layers and the second transport block carried by a second plurality of non-orthogonal multiple access layers; combine the first plurality of non-orthogonal multiple access layers following a first order to decode the first transport block from the first plurality of non-orthogonal multiple access layers; and combine the second plurality of non-orthogonal multiple access layers following a second order to decode the second transport block from the second plurality of non-orthogonal multiple access layers.

Example 15: The base station as recited in example 14, wherein the transport block manager is further configured to direct the base station to: determine that combining the first plurality of non-orthogonal multiple access layers following the first order to decode the first transport block from the first plurality of non-orthogonal multiple access layers has failed and, in response, transmit through the wireless transceiver and to the user equipment a negative acknowledgment message; and determine that combining the second plurality of non-orthogonal multiple access layers following the second order to decode the second transport block from the second plurality of non-orthogonal multiple access layers has succeeded and, in response, transmit through the wireless transceiver and to the user equipment an acknowledgment message.

What is claimed is:

1. A method performed by a base station comprising:
   determining, by the base station and for a first plurality of non-orthogonal multiple access layers, a first order;
   receiving, by the base station and from a user equipment, a transmission of a transport block, the transmission using the first plurality of non-orthogonal multiple access layers;
   attempting to decode the transport block from the first plurality of non-orthogonal multiple access layers by combining, by the base station, the first plurality of non-orthogonal multiple access layers in the determined first order;
   determining, by the base station, that combining the first plurality of non-orthogonal multiple access layers in the determined first order fails to decode the transport block from the first plurality of non-orthogonal multiple access layers;
   determining, by the base station and for a second plurality of non-orthogonal multiple access layers, a second order;
   receiving, by the base station and from the user equipment, a retransmission of the transport block, the retransmission using the second plurality of non-orthogonal multiple access layers; and
   attempting to decode the transport block from the second plurality of non-orthogonal multiple access layers by combining, by the base station, the second plurality of non-orthogonal multiple access layers in the determined second order.

2. The method as recited in claim 1, wherein determining the first order for the first plurality of non-orthogonal multiple access layers includes determining the first order from a wireless-communication specification.

3. The method as recited in claim 1, wherein determining the first order for the first plurality of non-orthogonal multiple access layers includes computing the first order based on locations of time and frequency resources comprising the first plurality of non-orthogonal multiple access layers.

4. The method as recited in claim 1, wherein determining the second order for the second plurality of non-orthogonal multiple access layers includes determining the second order from a wireless-communication specification.

5. The method as recited in claim 1, wherein determining the second order for the second plurality of non-orthogonal multiple access layers includes computing the second order based on locations of time and frequency resources comprising the second plurality of non-orthogonal multiple access layers.

6. The method as recited in claim 1, further comprising the base station using broadcast signaling to transmit, to the user equipment, the determined first order.

7. The method as recited in claim 6, wherein the broadcast signaling transmits the determined first order through a system information block that includes data indicative of the determined first order.

8. The method as recited in claim 1, further comprising the base station using dedicated signaling to transmit, to the user equipment, the determined first order.

9. The method as recited in claim 8, wherein the dedicated signaling transmits the determined first order through a radio resource control message that includes data indicative of the determined first order.

10. The method as recited in claim 1, further comprising the base station transmitting, in response to determining that combining the first plurality of non-orthogonal multiple access layers in the determined first order fails to decode the transport block from the first plurality of non-orthogonal multiple access layers, a negative acknowledgement message.

11. A method performed by a user equipment comprising:
    determining, by the user equipment and for a first plurality of non-orthogonal multiple access layers, a first order;
    transmitting, by the user equipment and to a base station, a transport block, the transmitting using the first plurality of non-orthogonal multiple access layers in the determined first order;
    receiving, by the user equipment and from the base station, a negative acknowledgment message, the negative acknowledgment message indicating that the base station failed to decode the transport block from the first plurality of non-orthogonal multiple access layers;
    determining, by the user equipment in response to receiving the negative acknowledgment message and for a second plurality of non-orthogonal multiple access layers, a second order; and
    retransmitting, by the user equipment and to the base station, the transport block, the retransmitting using the second plurality of non-orthogonal multiple access layers in the determined second order.

12. The method as recited in claim 11, wherein determining the first order for the first plurality of non-orthogonal multiple access layers includes determining the first order from data included in a radio resource control message that the user equipment receives from the base station.

13. The method as recited in claim 11, wherein determining the first order for the first plurality of non-orthogonal multiple access layers includes determining the first order from a wireless-communication specification.

14. The method as recited in claim 11, wherein determining the first order for the first plurality of non-orthogonal multiple access layers includes determining the first order by computing the first order based on locations of time and frequency resources that comprise the first plurality of non-orthogonal multiple access layers.

15. The method as recited in claim 11, wherein determining the second order for the second plurality of multiple access layers includes determining the second order from data included in a system information block that the user equipment receives through broadcast signaling that is received from the base station.

16. The method as recited in claim 11, wherein determining the second order for the second plurality of non-orthogonal multiple access layers includes determining the second order from a wireless-communication specification.

17. The method as recited in claim 11, wherein determining the second order for the second plurality of non-orthogonal multiple access layers includes determining the second order by computing the second order based on locations of time and frequency resources that comprise the second plurality of non-orthogonal multiple access layers.

18. A base station comprising:
a processor;
a wireless transceiver; and
computer-readable storage media storing instructions of a transport block manager that, upon execution by the processor, directs the base station to:
  determine for a first plurality of non-orthogonal multiple access layers, a first order;
  receive, through the wireless transceiver and from a user equipment, a transmission of a transport block, the transmission using the first plurality of non-orthogonal multiple access layers;
  attempt to decode the transport block from the first plurality of non-orthogonal multiple access layers by combining, by the base station, the first plurality of non-orthogonal multiple access layers in the determined first order;
  determine that combining the first plurality of non-orthogonal multiple access layers in the determined first order fails to decode the transport block from the first plurality of non-orthogonal multiple access layers;
  determine, for a second plurality of non-orthogonal multiple access layers, a second order;
  receive, through the wireless transceiver and from a user equipment, a retransmission of the transport block, the retransmission using the second plurality of non-orthogonal multiple access layers; and
  attempt to decode the transport block from the second plurality of non-orthogonal multiple access layers by combining, by the base station, the second plurality of non-orthogonal multiple access layers in the determined second order.

19. The base station as recited in claim 18, wherein the transport block manager, upon execution by the processor, further directs the base station to:
  determine that combining the first plurality of non-orthogonal multiple access layers in the first order to decode a first transport block from the first plurality of non-orthogonal multiple access layers has failed and, in response, transmit through the wireless transceiver and to the user equipment a negative acknowledgment message; and
  determine that combining the second plurality of non-orthogonal multiple access layers in the second order to decode a second transport block from the second plurality of non-orthogonal multiple access layers has succeeded and, in response, transmit through the wireless transceiver and to the user equipment an acknowledgment message.

20. The base station as recited in claim 19, wherein the negative acknowledgment includes a request for the user equipment to transmit the second transport block.

\* \* \* \* \*